United States Patent
Cocks

[15] 3,662,927
[45] May 16, 1972

[54] HOT-MELT ADHESIVE SYSTEMS
[72] Inventor: Eric H. Cocks, 21 Crane Avenue, West Caldwell, N.J. 07006
[22] Filed: Jan. 21, 1970
[21] Appl. No.: 4,501

[52] U.S. Cl. .................................222/146 HE, 222/309, 401/1
[51] Int. Cl. ..................................................................B67d 5/62
[58] Field of Search .........401/1, 2, 188; 222/146 H, 146 HS, 222/146 HE, 309

[56] References Cited

UNITED STATES PATENTS

| | | |
|---|---|---|
| 3,221,937 | 12/1965 | Kamborian ..................222/146 HE X |
| 3,314,574 | 4/1967 | Longval..........................222/146 HE |
| 2,518,748 | 8/1950 | Breer..........................222/146 HE X |
| 1,977,831 | 10/1934 | Marshall .....................222/146 H X |

*Primary Examiner*—Robert B. Reeves
*Assistant Examiner*—Thomas E. Kocovsky
*Attorney*—I. J. Crickenberger

[57] ABSTRACT

An apparatus for applying hot-melt adhesives comprises a heated tank which supplies fluid adhesive by gravity to an air-operated pump for distribution to a hand-held dispensing gun. The gun and pump are energized simultaneously or in such predetermined fashion as to facilitate accurate dispensing of the adhesive.

5 Claims, 7 Drawing Figures

Patented May 16, 1972

INVENTOR
ERIC H. COCKS

BY *J. J. Crickenberger*

ATTORNEY

Patented May 16, 1972

HOT-MELT ADHESIVE SYSTEMS

CROSS-REFERENCES TO RELATES APPLICATIONS

NONE.

BACKGROUND OF THE INVENTION

Hot-melt adhesives are adhesives which normally exist in solid form at room temperature. In appearance they are generally similar to waxes with certain additives and formulations. When heated to a temperature between 200° F. and 500° F. these adhesives liquify and may be dispensed and applied by appropriate equipment. Typical applications of such adhesives are found in the packaging industry where it is necessary to lay down lines of adhesive materials in the process of assembling boxes and other cartons.

It is frequently desirable to form the heated adhesives in short sections of lines, or even dots. Since the hot-melt adhesives are usually very viscous in nature, any precisely controlled application presents a problem. Even when the plunger or valve mechanism utilized in the dispenser opens and closes properly, the heated adhesive will be sluggish in leaving the nozzle unless there is a high pressure in the system. This may produce a dripping or drag of the adhesive and defeat the requirements of precise application. When high pressure is utilized in the system so that the adhesive leaves the dispenser promptly, there will still be occasions where the initial release of pressure will cause a greater thickness of adhesive at the beginning point of application. In some cases such as applying a hot adhesive to polyethylene, a greater thickness of adhesive can be objectionable since this greater mass retains more heat. If the adhesive temperature is close to the melting point of the plastic the heated adhesive may then cause the plastic to soften and adhere to itself.

In dispensing systems for adhesive and other materials the system may generally be classified as circulating or non-circulating in character. In a circulating system the material to be dispensed is constantly recirculated to prevent separation of the constitutents of the material and assure a uniform product. In hot-melt adhesive systems it is generally desirable to use a non-circulating system, since circulation of the adhesive tends to degrade the material and in many cases trap air bubbles. In using a non-circulating system for materials which are normally solid it becomes necessary to have sufficient heat throughout all parts of the system to keep the material in a fluid state.

Hot-melt adhesives are commonly dispensed at control stations from applicators or guns which are fixedly mounted. At times, however, it is desirable to apply such adhesives by hand operation in applications where the adhesives must be dispensed with precision. The normally available stationary applicators are not suitable for such purposes because of their awkward physical construction and the slow action in dispensing and cutting off the supply of melted adhesive.

A further need in apparatus for applying hot-melt adhesives is for a relatively low cost hot-melt unit. A typical system requires an expensive pump and relatively large enclosures. Although attempts have been made in the past to eliminate pumps, such as by using an air-pressurized tank, other problems result and it is seldom possible to obtain sufficient pressure for the required result. The use of pressurized containers also presents additional hazards plus difficulty in refilling, since the pressure must be released from the tank and the unit must cease operation while refilling is accomplished.

A feature of the present invention is the provision of a system for the dispensing of hot-melt adhesives in which a low-cost pump and dispensing system can be utilized with existing heated tanks.

Another feature of the invention is the provision of a hot-melt adhesive dispensing system which operates without the conventional check valves employed in other systems.

Another feature of the invention is the provision of a pump unit which may be mounted on the side of an existing heating tank and eliminate the need for an extra pump heater.

Still another feature of the invention is the provision of a hot-melt dispensing system in which the dispensing unit and the pump unit are controlled by the operator to produce clean shut-off with no drip of the adhesive material.

SUMMARY OF THE INVENTION

The system of the present invention comprises a non-pressurized adhesive supply tank which is heated to maintain the hot-melt adhesive material in a fluid state. The adhesive material is distributed by a pump unit which is mounted on the side of the tank so as to be heated from the heat within the tank, thereby eliminating the need for an extra heater. The pump is air-operated, and the piston diameters of the pump are so chosen as to give the required pressure on the adhesive material. Gravity flow is used between the tank and the pump, and the system operates without check valves.

The pump conveys the hot-melt adhesive to a hand-held dispensing unit containing a solenoid-operated valve plunger. The dispensing unit, or gun, has a trigger which operates electrically the solenoid valve in the gun and also a solenoid valve controlling air supply to the pump unit. The actuation of the dispensing gun and pump valve is controlled to produce the desired dispensing action.

DESCRIPTION OF THE PREFERRED EMBODIMENT

Figure 1:
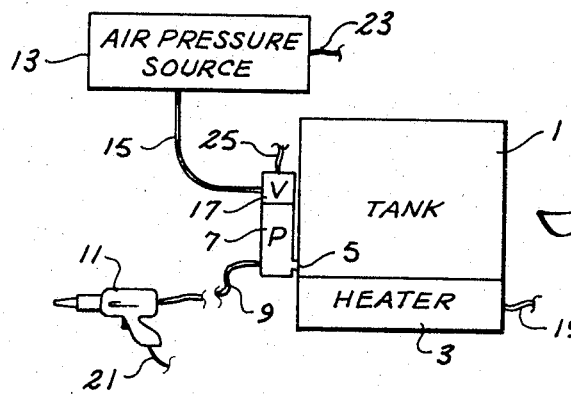
FIG. 1 is a diagrammatic representation of a system incorporating features of the present invention.

The invention will be understood more readily by referring to the drawings in which FIG. 1 is a diagrammatic representation of a system incorporating the new and novel features claimed. A tank 1 is provided for containing a quantity of hot-melt adhesive material. A heater 3 is located on the underside of tank 1 to melt the adhesive material and retain it in liquid form. An opening 5 in the lower portion of tank 1 allows the liquid hot-melt adhesive to flow by gravity into a pump unit 7 which distributes the adhesive through line 9 to a gun dispensing unit 11.

Pump unit 7 is operated by pressurized air from air pressure source 13 which is connected by line 15 to the solenoid-operated control valve 17 mounted on pump 7. The electrical sections of heater 3, gun 11, air pressure source 13, and control valve 17 are operated from a central control unit not shown, and cables 19, 21, 23 and 25, respectively, are shown leading from the component units to the central control.

Figure 2:
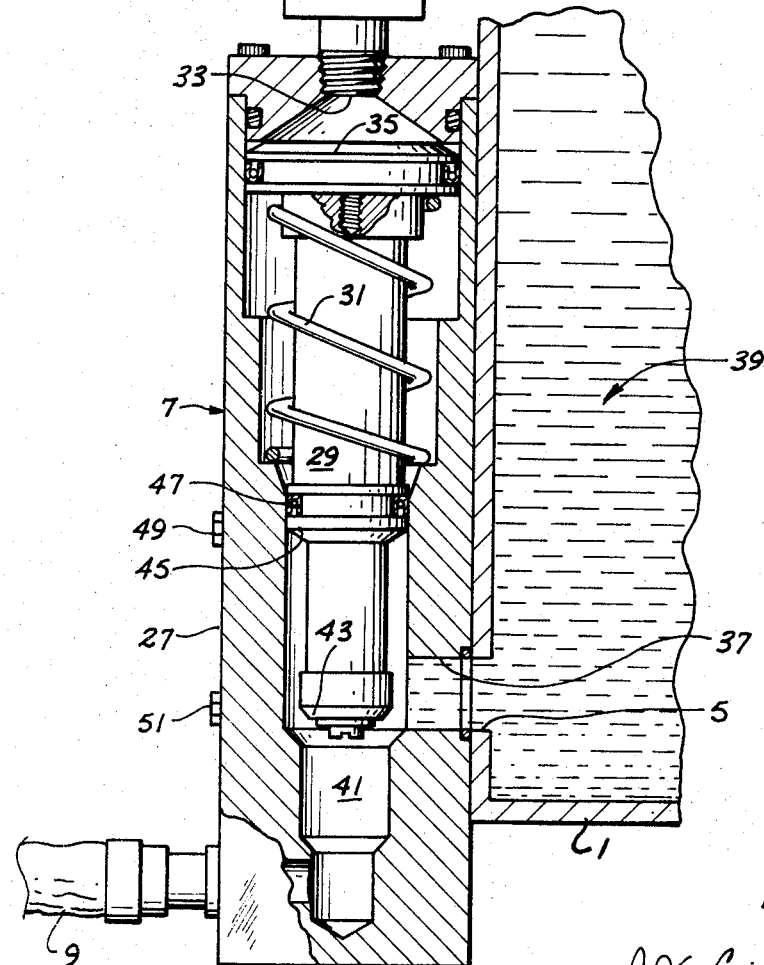
FIG. 2 is a partial section showing the pump unit mounted in position on the side of the tank.

FIG. 2 is a partial cross-section view of the pump unit 7, the pump being mounted in position on the side of tank 1. The pump 7 comprises a main housing 27 having a hollow interior in which a movable plunger 29 is mounted. Plunger 29 is biased by spring 31 to be maintained normally in the topmost position shown.

When air is introduced from valve 17 through opening 33, the air pressure on the upper face of piston 35 will force piston 35, and consequently plunger 29, downwardly. Housing 27 has an opening 37 which is aligned with opening 5 of tank 1 thereby allowing the hot-melt adhesive material 39 to flow by gravity into cavity 41 contained in housing 27. As plunger 29 moves downwardly, the smaller piston face 43 will enter cavity 41 and force the hot-melt adhesive material in cavity 41 out into line 9 leading to gun 11. Piston 45 and its associated sealing member 47 will cause any excess hot-melt adhesive material to be forced back into the tank 1 during the downward movement of plunger 29.

When plunger 29 reaches the bottom of its travel, no further hot-melt adhesive material can be dispensed until cavity 41 is refilled by the upward movement of plunger 29, which allows the flow of adhesive material 39 by gravity into cavity 41. The pressure developed on the fluid adhesive in cavity 41 will be in direct proportion to the areas of pistons 35 and 43. For example, if piston 35 is five times the area of piston 43, a 50 pound pressure on piston 35 would result in a 250 pound pressure being exerted upon the adhesive in cavity 41. The piston area ratio may be chosen to meet actual application requirements.

When the air pressure on piston 35 is released, the plunger 29 will return to its uppermost position under the force of bias spring 31, thereby permitting adhesive material again to flow into cavity 41. The size of cavity 41 will determine the total amount of adhesive which may be injected in any given plunger stroke. This equipment is not intended for steady application of large amounts of adhesive. The application of large amounts of adhesive material would require frequent triggering to produce multiple plunger actions.

The pump unit 7 is bolted to the side of tank 1 by means of bolts 49 and 51, and in the juxtaposition of the units as shown, good transfer of the heat from tank 1 eliminates the necessity of a separate heater element for pump 7.

Figure 3:
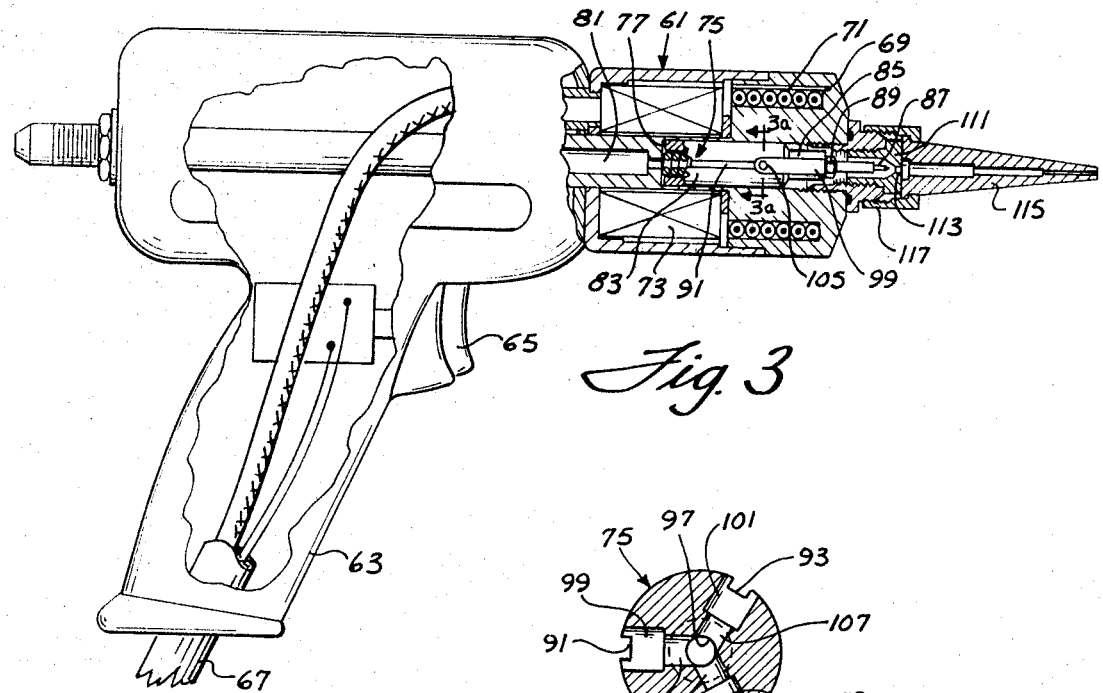
FIG. 3 is a partial section of the dispensing gun.
Figure 3A:
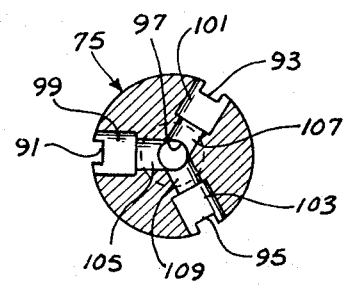
FIG. 3a is a cross-section of the gun plunger taken along line 3a — 3a of FIG. 3.

FIGS. 3 and 3a show details of the dispensing gun and plunger utilized in the system. The dispensing gun, indicated generally by the numeral 61, is of a conventional pistol shape having a handle 63 and trigger 65. An electrical cable 67 carries the necessary electrical control wires from the electrical control unit (not shown).

A thermistor-sensor element 69 senses the temperature within the gun 61 and activates an electrical heater coil 71. Heat is supplied to the adhesive within the gun by means of heater 71 under control of the thermistor-sensor element 69 such that operating consistency of the adhesive is maintained for immediate operation of the gun at all times the gun is in use.

A solenoid 73 operates the valve plunger 75, which is biased in closed position by means of spring 77. Valve plunger 75 is located in axial passageway 81 extending throughout the gun. Valve plunger 75 is made up of a body having a portion 83 of diameter closely approximating the size of axial passageway 81, and a portion 85 of reduced diameter. A replaceable tip 87 is fastened in the end of plunger 75 by means of screw threads. Lock nut 89 holds the replaceable tip 87 in place and allows for longitudinal adjustment and replacement. Plunger 75 has three evenly-spaced longitudinal slots 91, 93 and 95 of shallow depth disposed around its outer circumference. Each of these three shallow slots open into a wider and deeper slot communicating with the central longitudinal bore 97. The three deeper slots are shown at 99, 101 and 103, respectively. The slots 99, 101 and 103 communicate with the central longitudinal bore 97 by means of radial bores 105, 107 and 109, respectively. This structure allows both joint and alternate paths for the fluid around and through the plunger 75, thereby facilitating rapid operation of the plunger when viscous fluids are employed.

The fluid passageway 81 terminates in valve seat means 111 having an orifice 113 which is closed by valve tip 87. Valve tip 87 is normally biased against valve seat means 111 by means of the biasing spring 77 disposed in plunger 75. A nozzle member 115 is secured to the gun by means of a conventional internally-threaded sleeve 117. The nozzle 115 has a half-cone angle of 15° or less to render the work area adjacent the tip fully visible to an operator.

Figure 4:
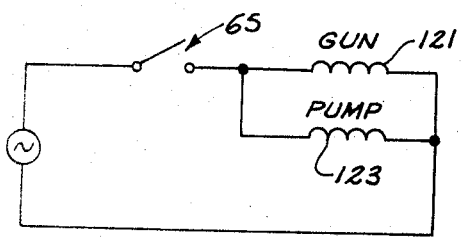
FIGS. 4 and 4a are alternate wiring diagrams of the gun and pump units for manual operation.
Figure 4A:
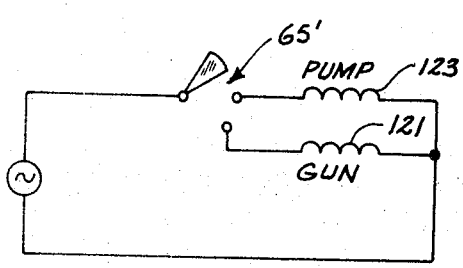

FIGS. 4 and 4a are alternate arrangements for the energization of the solenoids in gun 61 and pump valve 17 when dispensing is performed manually. In FIG. 4 when the gun trigger switch 65 is actuated, the switch closes to energize gun solenoid 121 and pump valve solenoid 123 at the same time. In this arrangement pressure is applied to the system at the same time the gun valve is opened to eject the hot-melt adhesive. There will be a slight lag in the dispensing of the adhesive with this arrangement.

In cases where a slight lag in the flow of hot-melt adhesive is undesirable, the arrangement shown in FIG. 4a may be utilized. Here, the gun switch 65' is shown as being a two-position switch closing first the contact to energize pump valve solenoid 123 to apply pressure to the system and immediately afterward, as the trigger pull continues, gun solenoid 121 is energized causing the dispensing valve to open.

Figure 5:
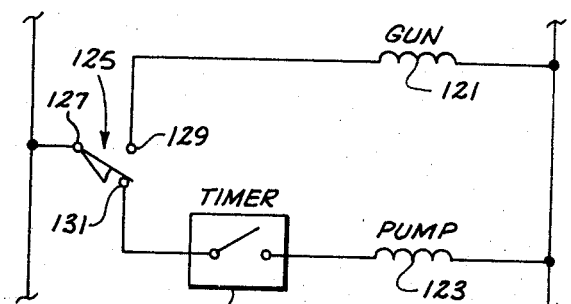
FIG. 5 is a wiring diagram of the gun and pump units for automatic operation.

FIG. 5 shows a wiring diagram for automatic operation and dispensing precise amounts of adhesive where immediate pressure is necessary as the gun actuates. Limit switch 125 is mounted as part of the machine circuit and has normally open contacts. When limit switch 125 is tripped, contact 127 is connected to contact 129, thereby energizing gun solenoid 121 to open the gun plunger 75 and allow the adhesive material to flow. In this arrangement the pump valve is normally open, and as long as pump valve solenoid 123 is not energized, air pressure will be on the pump piston to supply pressure throughout the system.

As soon as limit switch 125 is released, the gun shuts off and contact 127 is connected to contact 131 to energize the pump valve solenoid 123 and shut off the supply of air to allow the pump piston to return under pressure of the bias spring, thereby refilling cavity 41 with adhesive. The timer 133 is set for a very short period, and when the timer switch opens the pump valve solenoid 123 is de-energized thus immediately allowing air pressure to be applied to the pump piston to operate the gun.

In operation of the gun the valve plunger and tip are spring-biased against the valve seat in a normally closed position. Actuation of the gun trigger operates the gun solenoid and causes the valve plunger to be drawn away from the valve seat to open the passageway. The adhesive material being dispensed can travel through the central bore of the gun as well as down the circumferential slot in the valve plunger to permit rapid dispensing of relatively viscous materials. The movement of the plunger and the flow of adhesive is accelerated by the heating system which maintains operational viscosity of the adhesive under automatic control. The replaceable and adjustable valve tip structure extends the effective usefulness of the gun by enabling the user to select a desired tip and adjusts its length of travel in accordance with the viscosity of the material being dispensed. Full view of the work area is made possible by the small angle of the conical tip thereby allowing precise hand-held applications to be accomplished.

The system is simplified by eliminating all check valves and allowing gravity flow of material into the pump unit. The pump and dispensing gun may be an independent module to fit on existing tanks, and mounting the pump on the side of the tank eliminates the need for an extra heater in the system. Appropriate selection of piston diameters in the pump will multiply the force and produce any desired pressure.

What is claimed is:

1. A hot-melt adhesive system comprising tank means for storing hot-melt adhesive material,
    heater means for melting the adhesive material in said tank and maintaining the material in melted form,
    pump means mounted on said tank means, first and second cavity means within said pump for receiving melted adhesive,
    cylindrical plunger means mounted within said pump for reciprocating movement,
    a first piston portion on one end of said plunger means and located within said first cavity means,
    a second piston portion on the other end of said plunger means to fit within said second cavity means and force adhesive material therefrom, the reciprocating movement of said cylindrical plunger means being such that said second piston portion reciprocates from a first position within said first cavity means to a second position within said second cavity means.
    bias means in said pump for biasing said plunger toward said first piston portion, a passageway connecting said tank means to said second cavity means to allow the free flow of adhesive material in both directions, an air pressure source, means connecting said air pressure source to said pump, pump valve means mounted on said pump for controlling the air pressure on said first piston portion of said plunger, and dispensing gun means connected to said cavity means within said pump, said dispensing gun means comprising a fluid passageway within said gun, a valve plunger within said fluid passageway to control the flow of adhesive, dispensing orifice means, solenoid means for controlling the operation of said valve plunger to open and close said orifice means.

2. The combination according to claim 1 wherein
said second cavity means is located near a lower portion of said tank means to permit gravity flow of the melted adhesive material from the tank to the second cavity.

3. The combination according to claim 2 wherein
said first piston portion has a larger area than said second piston portion to produce a multiplication of pressure.

4. The combination according to claim 3 wherein
said dispensing gun includes means to actuate said valve plunger and said pump valve means simultaneously.

5. The combination according to claim 3 wherein
said dispensing gun includes means to actuate said pump valve means first and then actuate said valve plunger.

* * * * *